US005192975A

United States Patent [19]

Ide et al.

[11] Patent Number: 5,192,975

[45] Date of Patent: Mar. 9, 1993

[54] IMAGE FORMING APPARATUS WITH AN IMAGE SCANNING APPARATUS AND AN AUTOMATIC DOCUMENT FEEDER

[75] Inventors: Fumito Ide; Noriyuki Nomura, both of Kanagawa, Japan

[73] Assignee: Kabushiki Kaisha Toshiba, Kawasaki, Japan

[21] Appl. No.: 718,409

[22] Filed: Jun. 24, 1991

[30] Foreign Application Priority Data

Jun. 25, 1990 [JP] Japan .................................. 2-166324

[51] Int. Cl.[5] .............................................. G02G 15/04
[52] U.S. Cl. ..................................... 355/235; 355/311
[58] Field of Search ............... 355/233, 235, 309, 311; 271/3, 3.1

[56] References Cited

U.S. PATENT DOCUMENTS 4,366,219 12/1982 Beery ............................. 355/235 X
4,440,487 4/1984 Miura ................................. 355/311
4,538,903 9/1985 Lane ................................... 355/235
4,963,934 10/1990 Neza .................................. 355/235
4,967,232 10/1990 Obara ................................. 355/233

FOREIGN PATENT DOCUMENTS 60-90330 5/1985 Japan .................................. 355/235
2-10384 1/1990 Japan .

OTHER PUBLICATIONS

*IBM Technical Disclosure Bulletin,* vol. 17, No. 9, Feb. 1975, Bacon, "Copy Sheet Size Selection", p. 2690-90A.

*Primary Examiner*—Joan H. Pendegrass
*Attorney, Agent, or Firm*—Foley & Lardner

[57] ABSTRACT

An image forming apparatus of the present invention has an image forming device including an image scanning device and an automatic document feeder. A document on a platen located on the image forming device is positioned in a predetermined position. The scanning device starts the scanning operation from a starting position opposite to the predetermined position. The scanning position of the scanning device is individually determined to be a position corresponding to the document size detected by the detecting device. Therefore, the image forming operation is performed without failing to form the image on the copying paper. Furthermore, the speed of the image forming operation is increased.

9 Claims, 18 Drawing Sheets

| NUMBER OF PULSES FROM REV-SW (LENGTH (mm)) | SIZE-SW | DOCUMENT SIZE | STARTING POSITION |
|---|---|---|---|
| 0~196 | ON | B5—CROSSWISE | ① |
| 179~230 | OFF | A5—LENGTHWISE | ② |
| 196~281 | ON | A4—CROSSWISE | ② |
| 230~277 | OFF | B5—LENGTHWISE | ③ |
| 277~313 | OFF | A4—LENGTHWISE | ④ |
| 281~392 | ON | B4—LENGTHWISE | ⑤ |
| 392~ | ON | A3—LENGTHWISE | ⑥ |

Fig.6.

| DOCUMENT SIZE | TRANSFERRED LENGTH (mm) | NUMBER OF PROVIDED PULSES |
|---|---|---|
| A3 — LENGTHWISE | 62 | 496 |
| B4 — LENGTHWISE | 118 | 944 |
| A4 — LENGTHWISE | 185 | 1480 |
| B5 — LENGTHWISE | 225 | 1800 |
| A4 — CROSSWISE | 272 | 2176 |
| A5 — LENGTHWISE | 272 | 2176 |
| B5 — CROSSWISE | 300 | 2400 |

IMAGE FORMING APPARATUS WITH AN IMAGE SCANNING APPARATUS AND AN AUTOMATIC DOCUMENT FEEDER

BACKGROUND OF THE INVENTION

This invention relates to an image forming apparatus, such as a copying apparatus, for forming an image on an image bearing member in accordance with an image of a document placed on a platen.

As is well known, in recent years automatic document feeders have been developed in which a document is automatically placed in the exposure position on a platen. After exposure has been completed, the document is automatically discharged from the platen. High speed feeding operation in such an apparatus is a desirable feature.

One automatic document feeder which fulfills this high speed requirement is disclosed in Japanese Patent Disclosure (Kokai) No. 2-10384, Watanabe et al. In an automatic document feeder of this type, placement of the document at the exposure position and extraction of the document after completion of exposure are performed using a feed roll provided at the end of the platen.

However, in such a device, the mechanism for positioning the document in the exposure position is arranged at the feed roll end of the document placement platen. Moreover, the starting position for scanning by a scanning device that exposes and scans the document is set at an end on the opposite side of a reference position of the platen. As a result, when the size of the document is smaller than A4-crosswise, the scanning device scans over the half length of the document placement platen from the starting position of scanning at the end of the platen, irrespective of the document size. This means, for example, when the size of the document is B5-crosswise and the size of the copying paper is also B5-crosswise, the image of the document formed on the copying paper is shifted. Another problem is that the exposure and scanning time, which is longer than necessary, reduces the ability to increase the speed of image formation. In addition, the excess scanning wastes electric power.

Thus, conventional scanning devices scan the half length of the document placement platen, irrespective of the size of the document placed on the platen. As a result, when the size of the document and the size of the copying paper are smaller than the scanning length of the scanning device, the image of the document that is formed on the copying paper is shifted and part of the image of the document fails to be formed on the copying paper. Furthermore, in the case of small size documents, excess exposure and scanning time is required. This presents an obstacle to increasing the speed of copying.

SUMMARY OF THE INVENTION

Accordingly, it is an object of the invention to provide an image forming apparatus with an image scanning apparatus capable of performing the image scanning operation in a manner corresponding to the size of the document.

It is an another object of the invention to provide an image forming apparatus which is capable of increasing the speed of the image forming operation when the document provided by the automatic document feeder is of small size.

It is another object of the present invention to provide an image forming apparatus which is capable of scanning a range corresponding to the document type that is provided on the document placement platen by the automatic document feeder.

According to the present invention, there is provided an image scanning apparatus having a platen on which a document having an image is placed, means for scanning the image of the document placed on the platen from a starting position, means for receiving information designating the size of the document to be scanned by the scanning means and means for individually determining the starting position corresponding to the information received by the receiving means.

According to another embodiment of the present invention, there is provided an image forming apparatus having a platen on which a document having an image is placed, means for positioning one end of the document in a predetermined position on the platen, means for scanning the image of the document positioned by the positioning means from a starting position different from the predetermined position, means for forming an image on an image bearing member in accordance with the image scanned by the scanning means, means for receiving an information designating the size of the document to be scanned by the scanning means and means for individually determining the starting position of the scanning means corresponding to the predetermined position and the information received by the receiving means.

According to another aspect of the invention, an image forming apparatus has a platen on which a document with an image is placed, means for transferring the document placed on the platen, means for positioning the trailing edge of the document transferred by the transferring means, means for detecting the position of the leading edge opposite to the trailing edge of the document on the platen corresponding to the size of the document positioned by the positioning means, means for scanning the image of the document placed on the platen from the position of the leading edge detected by the detecting means and means for forming an image on an image bearing member in accordance with the image scanned by the scanning means.

BRIEF DESCRIPTION OF THE DRAWINGS

A more complete description of the present invention and many of the attendant advantages thereof will be readily obtained as the invention becomes better understood by reference to the following detailed description when considered in connection with the accompanying drawings, wherein:

FIG. 6 is a diagram showing discrimination data used for the document size detection;

DETAILED DESCRIPTION OF THE PREFERRED EMBODIMENTS

Figure 1:
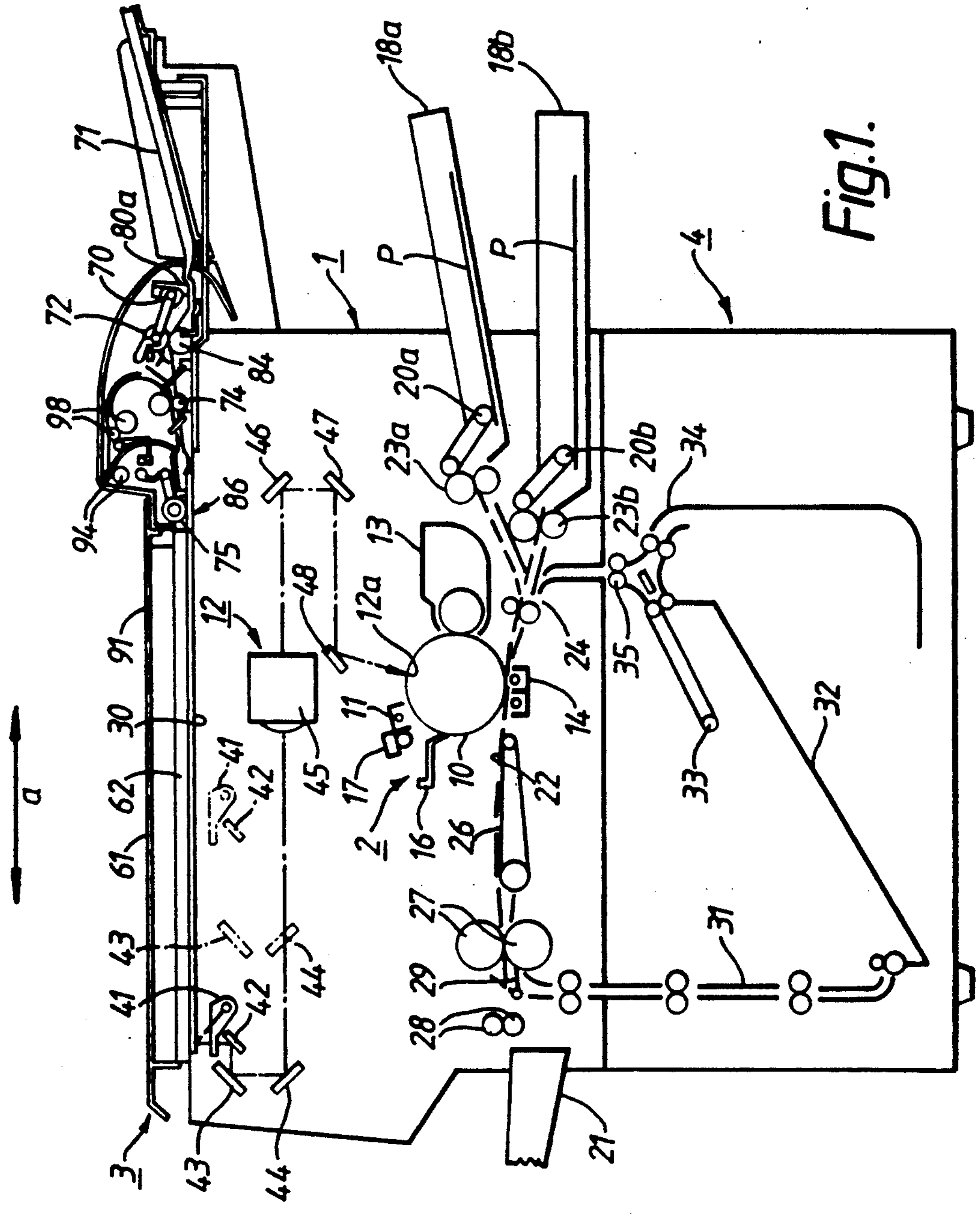
FIG. 1 is a sectional front view showing the construction of an image forming apparatus including an automatic document feeder.

FIG. 1 shows an image forming apparatus with an automatic document feeder according to the present invention.

A main device unit 1 has an image forming device 2 for charging, exposing, developing, transferring, fixing, and cleaning. An automatic document feeder ("ADF") 3 is provided on the top face of main device unit 1, while an automatic duplexing device ("ADD") 4 is provided below main device unit 1 for double sided copying.

Near the middle of main device unit 1 there is provided a drum-shaped photosensitive member 10 rotated in the clockwise direction in the figure. The surface of photosensitive member 10 is first charged by a charging device 11. Then, the charged photosensitive member surface passes through exposure region 12*a*. At this time, an optical image corresponding to a document image is guided to the photosensitive member surface through exposing device 12. As a result, an electrostatic latent image is formed on the surface of photosensitive member 10. This image is developed by developer particles from a developing device 13. Thus, a developed image is transferred onto copying paper P by a transferring and releasing charger 14. After that, the surface of photosensitive member 10 passes a cleaning device 16 and a discharging lamp 17. Cleaning device 16 eliminates residual developer particles from the surface of photosensitive member 10. Discharging lamp 17 discharges photosensitive member 10. On the right side of main device unit 1, there are provided a first paper cassette 18*a* and a second paper cassette 18*b* that store copying papers P. In main device unit 1, there is formed a feed path 22 (shown by a broken line) that guides copying paper P picked up by a first pickup roller 20*a* from first paper cassette 18*a* or a second pickup roller 20*b* from second paper cassette 18*b* past photosensitive member 10 and onto a paper discharge tray 21 provided on the left side of main device unit 1. At the front end of first paper cassette 18*a* and second paper cassette 18*b*, there is formed a projection (not shown) indicating the size of copying paper P stored in the cassette. This is detected by a paper size detection device (not shown) in main device unit 1.

On the upstream side of feed path 22 from photosensitive member 10, first separating rollers 23*a*, second separating rollers 23*b* and aligning rollers 24 are located to transfer copying paper P to photosensitive member 10 one by one. On the downstream side of feed path 22 from photosensitive member 10 are located, a conveyor belt 26, fixing rollers 27 for fixing the developing image on copying paper P and a gate 29. Gate 29 alternatively guides copying paper P either towards paper discharge tray 21 through paper discharge rollers 28 or towards ADD 4. On the top of main device unit 1, a platen 30 for supporting a document D having an image is located. Document D is placed on platen 30 with its trailing edge aligned in a reference position. In ADD 4, a guide unit 31 guides copying paper P into a stacking unit 32. Then, copying paper P is picked up from stacking unit 32 one by one by a pickup roller 33. After the picked up copying paper P is inverted by an inverting unit 34, conveyor rollers 35 convey copying paper P to aligning rollers 24 of main device unit 1.

As shown in FIG. exposing device 12 contains an exposure lamp 41 and mirrors 42, 43 and 44, which are reciprocally movable in the directions of the arrows "a" and further contains a lens block 45 and mirrors 46, 47 and 48. Exposing device 12 optically scans document D from one end to the other. The light reflected from document D is directed to the surface of photosensitive member 10, through a slit (not shown) to form the electrostatic latent image thereon.

Figure 2:
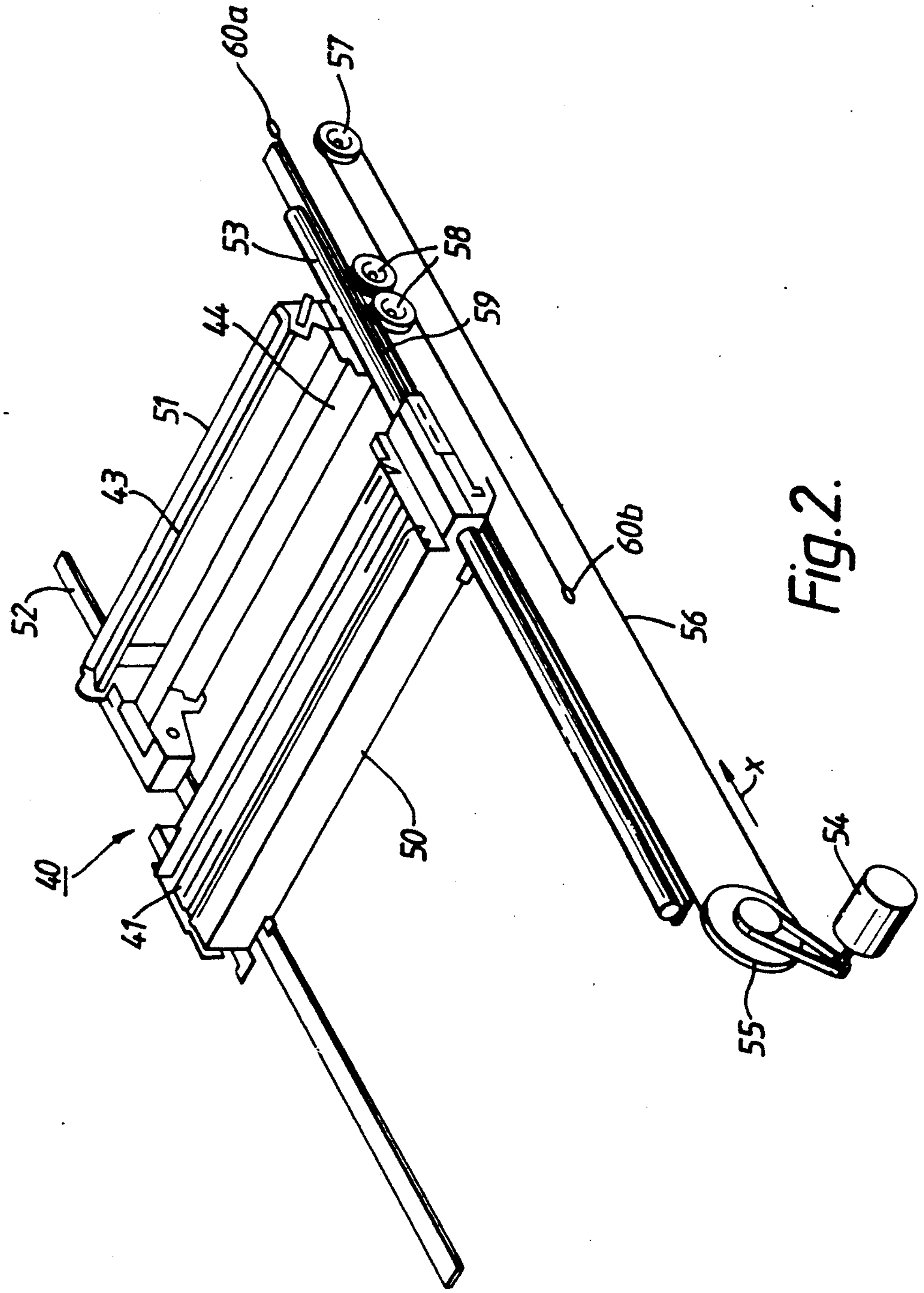
FIG. 2 is a perspective view showing in outline the drive mechanism of a scanning device.

Scanning device 40 for scanning document D is shown in FIG. 2. Exposure lamp 41 and mirror 42 are supported by a first carriage 50. On the other hand, mirrors 43 and 44 are supported by a second carriage 51. Carriages 50 and 51 are guided by guide rails 52 and 53, and can move in the direction indicated by arrow "a". A fourphase stepping motor 54 drives pulley 55. A wire 56 is stretched by pulley 55, a pulley 57 and pulleys 58. One end of first carriage 50 supporting the mirror 42 is fixed to the middle portion of wire 56. Two pulleys 58 are rotatably attached to a guide portion 59 (for the rail 53) of the second carriage 51 and spaced in the axial direction of the rail 53. Both ends of wire 56 are connected directly to fixed portions 60*a* and 60*b*.

Therefore, when stepping motor 54 is driven, wire 56 turns around to move first carriage 50. As first carriage 50 travels, the second carriage 51 also travels. Since pulleys 58 are served as movable pulleys, second carriage 51 travels in the same direction but at half the speed of first carriage 50. The traveling direction of first and second carriage 50 and 51 are in a direction corresponding to the rotating direction of stepping motor 54.

According to this arrangement, the image forming operation is performed as follows. In image forming device 2, exposure lamp 41 in exposing device 12 irradiates document D via platen 30. The light reflected from document D, which is exposed by exposure lamp 41, proceeds downward as shown by the arrow a. Then, via mirrors 42, 43 and 44, lens block 45 and mirrors 46, 47 and 48, the light illuminates photosensitive member 10, which is arranged near the middle of main device unit 1. At this time, photosensitive member 10 is charged to the prescribed potential by the corona discharge from charging device As a result, an electrostatic latent image corresponding to the image on document D is formed on the surface of photosensitive member 10. The electrostatic latent image is developed by the developing device 13 while photosensitive member 10 is rotated in the clockwise direction. The developed image is transferred to copying paper P, which is provided from first paper cassette 18*a* or second paper cassette 18*b* by transferring and releasing charger 14. The developed image on copying paper P is fixed by going through fixing rollers 27, and copying paper P is discharged from paper discharge rollers 28. Here, photosensitive member 10 passed through transferring and releasing charger 14 goes through cleaning device 16, discharging lamp 17, and charging device 11 in succession, to be charged again to the prescribed potential by the corona discharge from charging device 11.

ADF 3 includes a document cover 61 having a platen sheet 62. Document cover 61 is mounted on main device unit 1. Platen sheet 62 is movably supported between a first position which presses platen 30 and a second position which is separated from platen 30.

As illustrated in FIGS. and 3, ADF 3 comprises a pick up roller 70 located near an exit side of a document tray 71, and has a document separating device 72 located in the downstream side of pickup roller 70. Pickup roller 70 is movably arranged in the vertical direction. In a lower position, pickup roller 70 is in contact with the uppermost one of the documents D placed on document tray 71.

When driven pickup roller 70 feeds the uppermost document D from document tray 71. Document separating device 72 includes a document feeding roller 72*a* and a document separating roller 72*b*. Document feeding roller 72*a* is driven in the forward direction to feed document D from document tray 71 via pickup roller 70. Document separating roller 72*b* is located below document feeding roller 72*a* and driven in the reverse direction. Thus, document separating device 72 prevents the second uppermost document from being fed with the uppermost document D. Rotation of document separating roller 72*b* is started or stopped by a feed solenoid ("FEED-SOL") 72*s* (See FIG. 4). Pickup roller 70 and document separating device 72 feed documents D one by one from document tray 71 into a document path 73, shown as a broken line In document path 73, aligning rollers 74 are located in the downstream side of document separating device 72. Aligning rollers 74 align a leading edge of document D fed by document separating device 72, then feed document D between platen 30 and platen sheet 62, which separates from platen 30. Rotation of aligning rollers 74 is started or stopped by aligning solenoid ("RGT-SOL") 74*s* (See FIG. 4).

At end of the document path 73, a sending roller 75 is movably arranged in the vertical direction. In the lower position, sending roller 75 opposes platen 30 in the lower position and feeds document D from aligning rollers 74 to a prescribed position on platen 30. Sending roller 75 and pickup roller 70 are moved in the vertical direction by a pickup solenoid ("PICK-SOL") 75*s*. Sending roller 75 is driven to rotate by a send motor ("SE-MOT") 75*m* (See FIG. 4).

Figure 3:
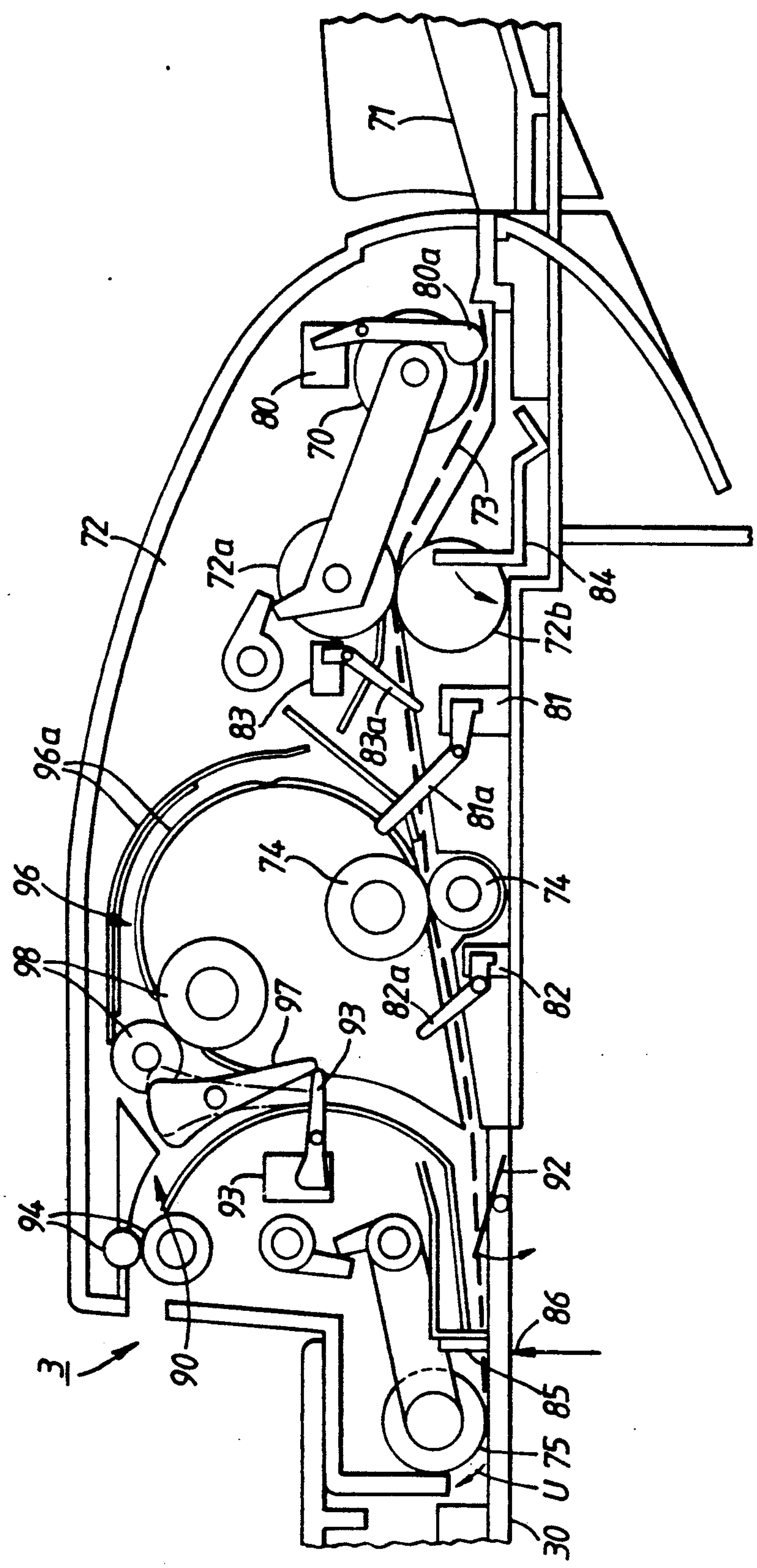
FIG. 3 is a sectional front view illustrating the major components of the automatic document feeder.
Figure 4:
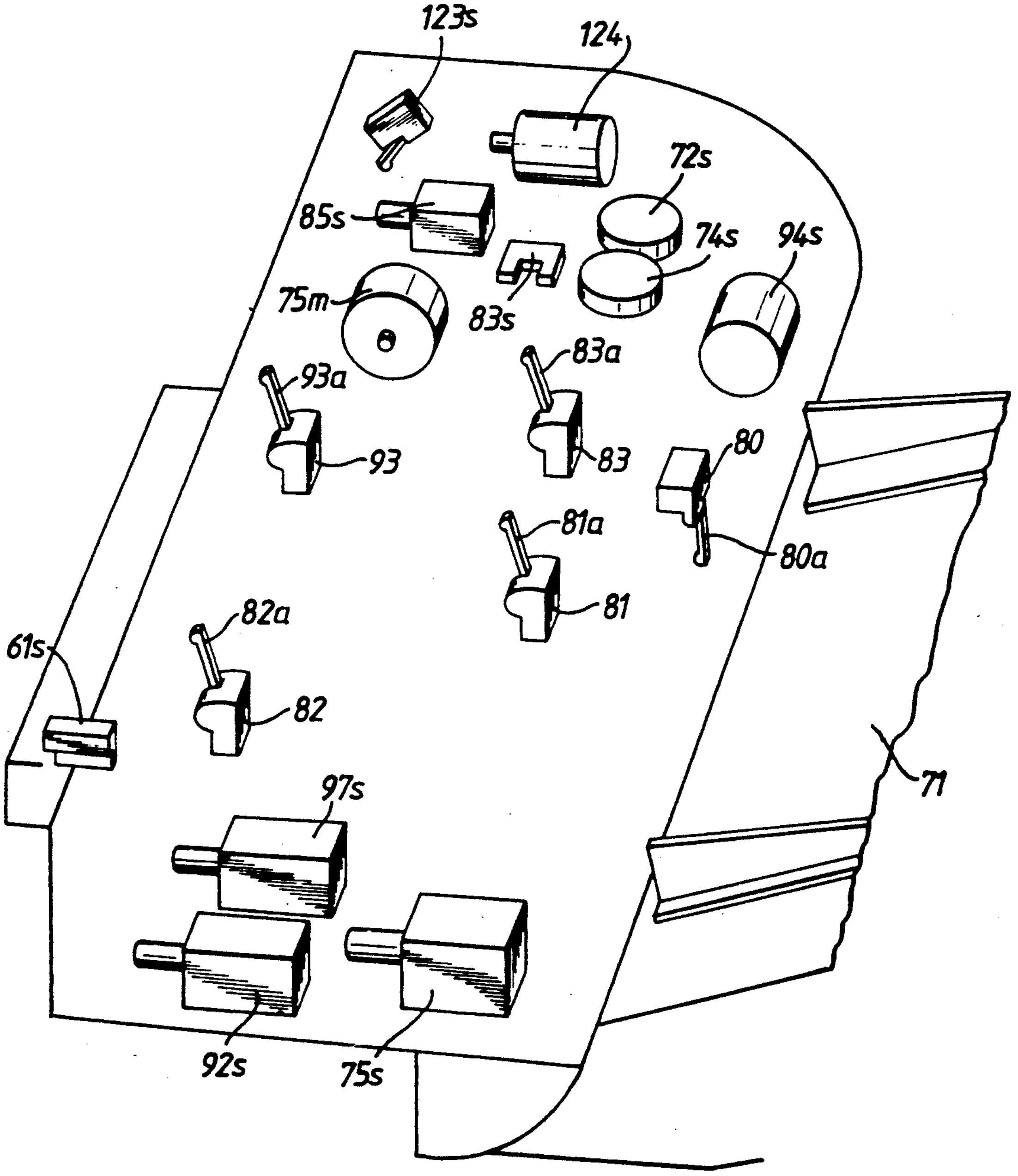
FIG. 4 is a perspective view of the document feeding section of the automatic document feeder, showing the electronic components arranged on the document feeding section.

As shown in FIGS. 3 and 4, an empty switch 80 ("EMP-SW") having an actuator 80*a* is located near the exit side of document tray 71. EMP-SW 80 detects the presence of document D on document tray 71.

A resistor switch ("RGT-SW") 81 having an actuator 81*a* is located between document separating device 72 and aligning rollers 74. RGT-SW 81 starts and stops aligning roller 74 rotation. Also, edge-switch ("EDG-SW") 82 having an actuator 82*a* is located near the exit of aligning rollers 74. EDG-SW 82 detects the trailing edge of each document D. Further, a size switch ("SIZE-SW") 83, which has an actuator 82*a*, is located near the exit of document separating means 72. A reverse switch ("REV-SW") 83*s* (see FIG. 4), with SIZE-SW 83, is disposed to detect document size. REV-SW 83*s* generates a number of pulses corresponding to rotations of aligning rollers 74.

A first document stopper 84 is arranged at the entrance to document separating device 72, for positioning each document D in document tray 71. A second document stopper 85 is movably arranged in the vertical direction at the entrance to sending roller 75. When document D is fed from aligning rollers 74 to sending roller 75, second document stopper 85 is moved into the upper position by a stopper solenoid ("STOPPER-SOL") 85*s* (See FIG. 4).

In the lower position of STOPPER-SOL 85*s*, second document stopper 85 positions each document D in a position 86.

A document ejecting path 90 extends upwards from a position between EDG SW 82 and sending roller 75. Document ejecting path 90 is defined by a plate and designed to guide each document D from platen 30 into a document receiving portion 91 (see FIG. 1) when sending rollers 75 are rotated in a reverse direction.

An inverting device 92 is located at the position where document ejecting path 90 branches from the document path 73. Inverting device 92 is rotated by an inverting solenoid ("INVT-SOL") 92*s* (See FIG. 4). A gate switch ("GATE-SW") 93, which has an actuator 93*a*, is located in document ejecting path 90 and detects jamming ("JAM") of documents D. Further, document ejecting rollers 94 are located at the end of document ejecting path 90. Document ejecting rollers 94 eject document D to document receiving portion 91. Document feeding roller 72*a* and document ejecting rollers 94 are driven by an original document feed motor ("DF-MOT") 94*s* (See FIG. 4).

A document returning path 96, which is curved by guide plate 96*a*, branches from document ejecting path 90 at a position between gate switch 93 and document ejecting rollers 94. Document returning path 96 extends to the entrance to aligning rollers 74.

A sorting gate 97 is located at the position where document returning path 96 branches from document ejecting path 90. Sorting gate 97 is rotated by a gate solenoid ("GATE-SOL") 97*s* (See FIG. 4). Document inverting rollers 98 are located near sorting gate 97.

Figure 5:
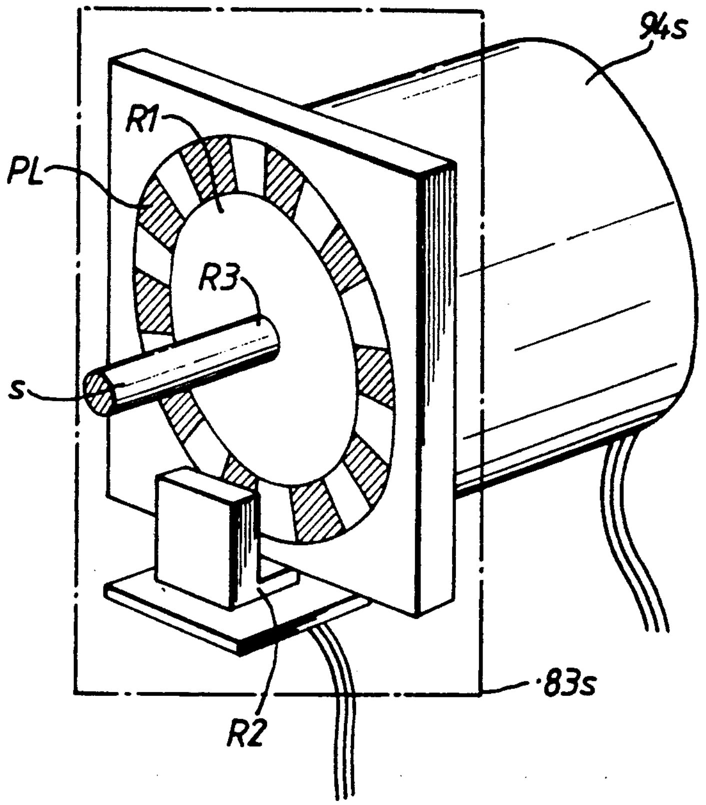
FIG. 5 is a perspective view showing a revolution switch for generating the number of pulses corresponding to the document size.

The document size detecting operation will be described. Aligning rollers 74 start rotating when RGT-SW 81 turns on. In lengthwise feeding, the document size is determined by the number of pulses from REV-SW 83*s* and the signal from SIZE-SW 83. In particular, it is important to detect the document length along the scanning direction of scanning device 40. As shown in FIG. 5, REV-SW 83*s* has a disk R1 and photointerrupter R2. Disk R1 has a center portion which is secured to a rotary shaft S of DF-MOT 94*s* for driving aligning rollers 74. Therefore, disk R1 is rotated by DF-MOT 94*s* in the same rotational direction. A plurality of plates PL are formed as teeth along the periphery of disk R1. Photointerrupter R2 has a U-shape, and disk R1 is movably located at the recessed section of photointerrupter R2. According to this arrangement, photointerrupter R2 generates a pulse when the plate PL of disk R1 passes the recessed section of the photointerrupter. A pulse is generated while document D is fed a millimeter ("mm") by aligning rollers 74.

In addition, SIZE-SW 83 is located in a predetermined position at which document D is detected, when a document size is B5 (257 mm×182 mm)-crosswise, A4 (297 mm×210 mm)-crosswise, B4 (364 mm×257 mm)-lengthwise or A3 (420 mm×297 mm)-lengthwise. As shown in FIG. 6, the document size is determined by a signal from SIZE-SW 83 and the number of pulses from REV-SW 83*s*.

Namely, when the number of pulses from REV-SW 83*s* is 0 to 198 and SIZE-SW 83*s* is turned ON, the document size is determined to be B5-crosswise.\For this condition, a scan starting position ("STARTING POSITION") of first carriage 50 is determined to be STARTING POSITION 1. When the number of pulses from REV-SW 83*s* is 179 to 230 and SIZE-SW 83 is turned OFF, the document size is determined to be A5 (210 mm×148 mm)-lengthwise. In this condition, STARTING POSITION of first carriage 50 is determined to be STARTING POSITION 2.

In the same way, the document size is determined, as corresponding to the signal from SIZE-SW 83 and the number of pulses from REV-SW 83*s*, to be A4-crosswise, B5-lengthwise, A4-lengthwise, B4-lengthwise or A3-lengthwise. Furthermore, the STARTING POSITION of first carriage 50 is determined to be STARTING POSITION 1, 2, 3, 4, 5 or 6, to correspond with the document size.

Figure 7:
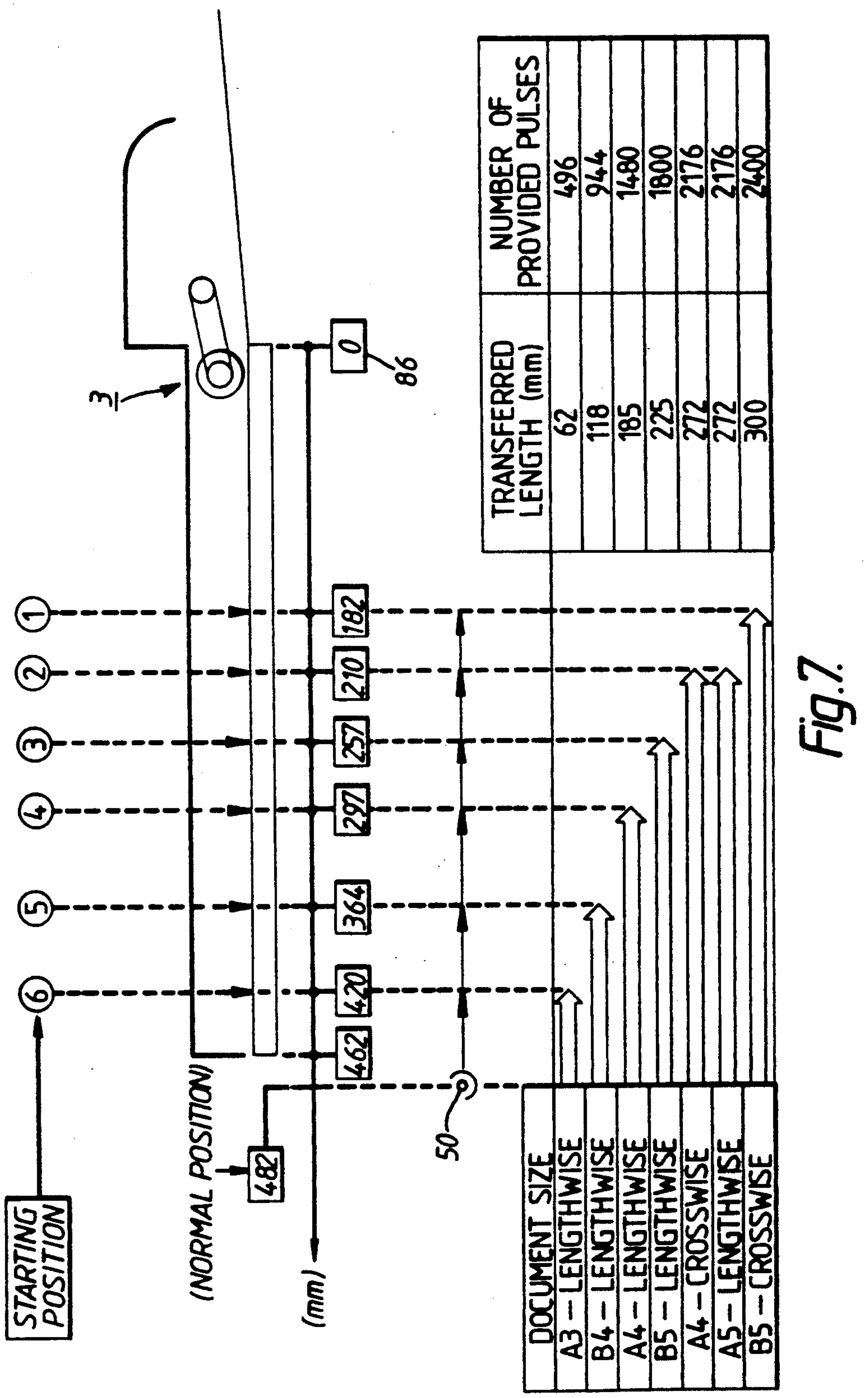
FIG. 7 is a diagram showing the relationships between the document size detected and a scan starting position of a first carriage.

First carriage 50 is moved by stepping motor 54 to STARTING POSITION 1, 2, 3, 4, 5 or 6, as determined in the aforementioned manner, and set. As shown in FIG. 7, STARTING POSITION 1 is located 182 mm apart from predetermined position 86. First carriage 50 is typically in a normal position located 482 mm apart from position 86. Therefore, to set the carriage to starting position 1, first carriage 50 is transferred 300 mm to the right in FIG. 7. During this time, stepping motor 54 is provided with 2400 pulses, because first carriage 50 is transferred ⅛ mm for each pulse. STARTING POSITION 2 is located 210 mm apart from position 86. In this time, stepping motor 54 is provided with 2176 pulses, so that first carriage 50 is transferred for 272 mm to the right from its typically normal position. STARTING POSITION 3 is located in 257 mm apart from position 86. During this time, stepping motor 54 is provided with 1800 pulses, so that first carriage 50 is transferred 225 mm from its typically normal position. STARTING POSITION 4 is located 297 mm apart from position 86. During this time, stepping motor 54 is provided with 1480 pulses, so that first carriage 50 is transferred 185 mm from its typically normal position. STARTING POSITION 5 is located 364 mm. apart from position 86. During this time, stepping motor 54 is provided with 944 pulses, so that first carriage 50 is transferred for 118 mm from its typically normal position. STARTING POSITION 6 is located 420 mm apart from position 86. During this time, stepping motor 54 is provided with 496 pulses, so that first carriage 50 is transferred 62 mm from its typically normal position.

Figure 8:
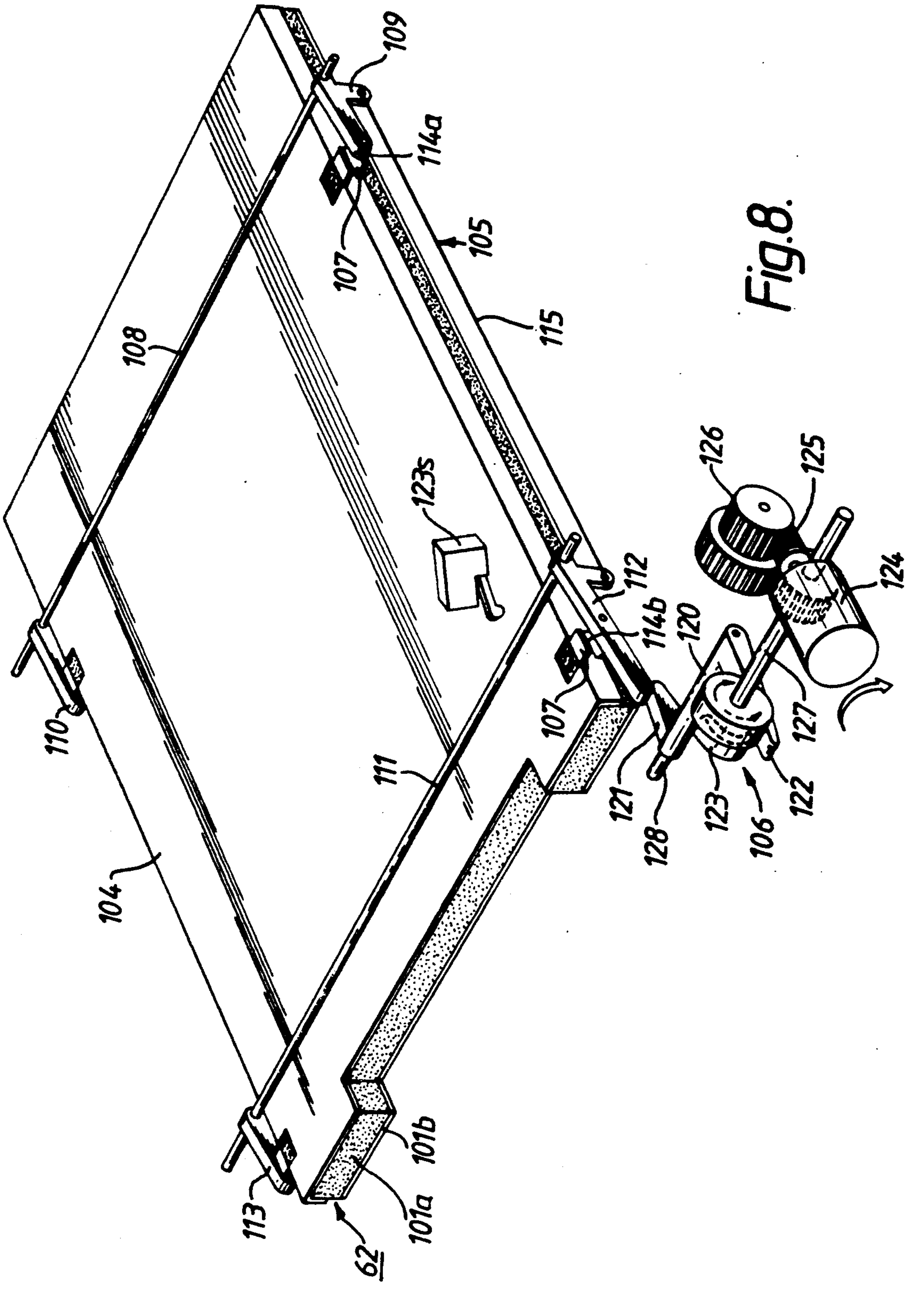
FIG. 8 is a perspective view showing a platen sheet and a platen sheet driving device, both incorporated in the automatic document feeder.

As shown in FIG. 8, platen sheet 62 is located within document cover 61. A platen sheet driving device 100 is designed to move platen sheet 62 away from platen 30.

Platen sheet 62 is substantially identical to platen 30 in both size and shape. Platen sheet 62 comprises an elastic sheet 101*a* made of urethane or the like and a white sheet 101*b* adhered to the lower surface of white sheet 101*b*. White sheet 101*b* is made of a material having a low friction coefficient. An elongated U-shaped notch 102 is cut in one side of platen sheet 62. Sending roller 75 is located at a position corresponding to elongated U-shaped notch 102. The upper surface of platen sheet 62 is covered by document cover 61, which is hinged, at the rear end, to main device unit 1.

Platen sheet driving device 100 is designed to drive platen sheet 62 in the vertical direction, while platen sheet 62 is maintained in a horizontal position. Therefore, platen sheet driving device 100 produces a gap between platen sheet 62 and platen 30 in document cover 61. While platen sheet 62 is set at the lower position, platen sheet 62 uniformly contacts platen 30. While platen sheet 62 is set at the upper position, a gap is formed between platen 30 and platen sheet 62.

Platen sheet driving device 100 includes a movable frame 104, a parallel link mechanism 105 and a link actuating mechanism 106. Platen sheet 62 is adhered to movable frame 104 and is held by movable frame 104. Movable frame 104 has projections protruding outward from the opposing sides, each projection 107 being formed, for example, from a portion of either side by pulling the portion up and bending the portion 180 degrees. Parallel link mechanism 105 has a first shaft 108, arms 159 and 160, a second shaft 111, arms 112 and 113, and pins 114*a* and 114*b*. First shaft 108 extends horizontally in document cover 61 and is rotatably arranged. Arms 109 and 110 are fixed to the end portions of first shaft 108. Similarly, second shaft 111 extends horizontally in document cover 61 and parallel to first shaft 108. Arms 112 and 113 are fixed to the end portions of second shaft 111. Pins 114*a* and 114*b* protrude from arms 109, 110, 112 and 113, respectively, and are set in engagement with projections 107 protruding from the opposing sides of movable frame 104.

Arms 109 and 112, fixed shaft 108 and second shaft 111, respectively, are connected by a connecting wire 115. Similarly, arms 110 and 113 fixed to first shaft 108 and second shaft 111 are connected by a connecting wire (not shown). When the free end of arm 112 secured to second shaft 111 is pushed upward, platen sheet 62 is moved upward, while remaining in the horizontal position, against the force of a spring (not shown) which biases platen sheet 62 downward.

Link actuating mechanism 106 will now be described. A crank shaped rotary member 120 is located in the vicinity of arm 112. A lever 121 is fastened to one end of rotary member 120 and opposes the lower surface of the free end portion of arm 112. A lever 122 is fastened to the other end of rotary member 120 and opposes the lower surface of cam 123. Cam 123 is connected to a platen motor 124 by a transmission device comprising a worm gear 125, gears 126 and a shaft 127. Furthermore, a cam switch ("CAM-SW") 123*s* is located near platen sheet 62. CAM-SW 123*s* is turned on while platen sheet 62 is in the upper position, and is turned off when platen sheet 62 is in the lower position. Hence, the driving force of platen motor 124 is transmitted to cam 123 until CAM-SW 123*s* is turned on or off.

When the shaft of platen motor 124 rotates in one direction, cam 123 is rotated in the direction of the solid-line arrow. As a result, crank shaped rotary member 120 is rotated around the axis of a shaft 128, and pushes up the free end of arm 112. Therefore, platen sheet 62 is lifted while remaining in the horizontal position, and a uniform gap is maintained between platen 30 and platen sheet 62.

When the shaft of platen motor 124 rotates in the opposite direction, cam 123 is rotated in the direction of the broken line arrow. Hence, crank shaped rotary member 120 is rotated around the axis of shaft 128, and moved downwards away from the free end of arm 112. As a result, platen sheet 62 is lowered because of the downward pull of a spring (not shown) until platen sheet 62 contacts platen 30.

Meanwhile, a platen switch ("PLTN-SW") 61*s* is located near document cover 61. PLTN-SW 61*s* is turned on when document cover 61 is closed. ADF 3 can be driven only when PLTN-SW 61*s* has been turned on.

Figure 9A:
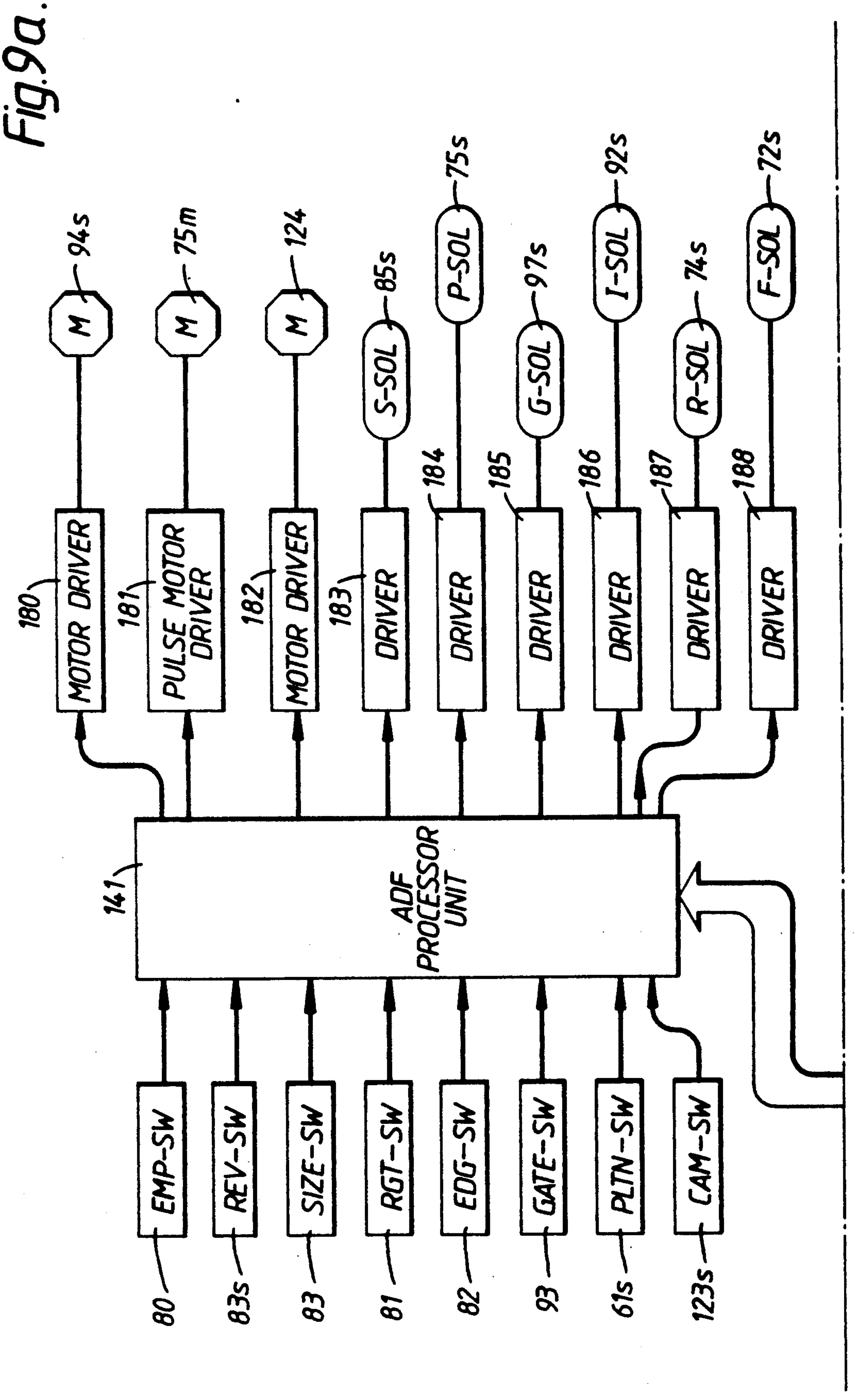
FIGS. 9*a*–*b* are diagrams showing the principal part of a control device.
Figure 9B:
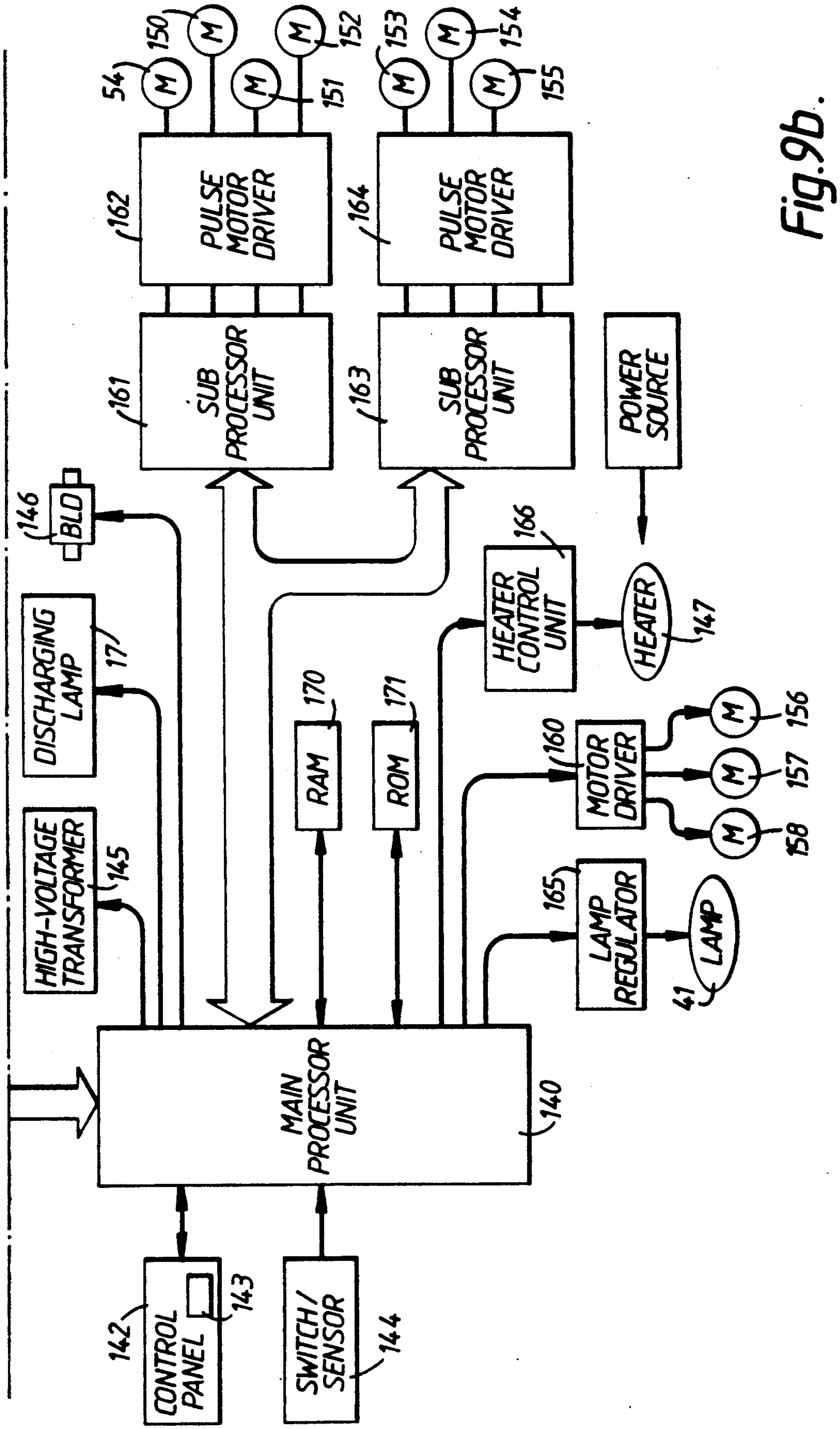

As shown in FIGS. 9*a–b*, a control system includes main processor unit 140 and an ADF processor unit 141 connected by signal lines to each other. Main processor unit 140 determines STARTING POSITION of first carriage 50. ADF processor unit 141 receives information concerning the document size from SIZE-SW 83 and REV-SW 83*s*.

Main processor unit 140 detects input signals from ADF processor unit 141, a control panel 142, which includes a copy key 143 for starting the image forming operation, and an input device 144 including switches and sensors (not shown). Then, main processor unit 140 connects to a high-voltage transformer 145 for energizing charging device 11 and transferring and releasing charger 14, discharging lamp 17, blade solenoid 146 for pressing a cleaning blade (not shown) of a cleaning device 16 to photosensitive member 10, heater 147 for fixing rollers 27, exposure lamp 41, and various motors 54 and 150 to 158, thereby executing the aforementioned image forming operation.

Motor 150 is a lens motor, which is used to shift the position of lens block 45 to change the magnification. Motor 151 is a mirror motor, which is used to change the distance (optical path length) of mirror 44 to mirrors 46 and 47, for a change of the magnification. Motor 152 is a shutter motor which is used to move a shutter (not shown) to adjust the width of charging device 11 at the time of the magnification change. Motor 153 is a drum motor for driving photosensitive member 10. Motor 154 is a paper supply motor, which serves to drive first pickup roller 20*a*, second pickup roller 20*b*, first separating rollers 23*a* and second separating rollers 23*b*. Motor 155 is a paper feed motor which serves to drive aligning rollers 24. Motor 156 is a developing motor for driving a developing roller and other components of developing device 13. Motor 157 is a fixing motor which is used to drive conveyor belt 26, fixing rollers 27 and paper discharge rollers 28. Motor 158 is used to supply toner to developing device 13. Motors 156 to 158 are controlled by main processor unit 140 through motor driver 160. Motors 54 and 150 to 152 are controlled by sub-processor unit 161 through pulse motor driver 162. Motors 153 to 155 are controlled by sub-processor unit 163 through pulse motor driver 164. Exposure lamp 41 is controlled by main processor unit 140 with the aid of a lamp regulator 165. Heater 147 is controlled by main processor unit 140 with the aid of a heater control unit 166.

Main processor unit 140 is provided with RAM (random access memory) 170 and ROM (read only memory) 171. RAM 170 stores document size data used in determining STARTING POSITION of first carriage 50 in accordance with the number of pulses from REV-SW 83*s*. ROM 171 stores the image forming operation data for forming the image on copying paper P which includes the operation data for detecting the document size.

ADF processor unit 141 detects input signals from main processor unit 140, EMP-SW 80, REV-SW 83*s*, SIZE-SW 83, RST-SW 81, EDG-SW 82, GATE-SW 93, PLTN-SW 61*s* and CAM-SW 123*s*. Then, ADF processor unit 141 controls DF-MOT 94*s* through motor driver 180, SE-MOT 75*m* through pulse motor driver 181, PLTN-MOT 124 through motor driver 182, STOPPER-SOL 85*s* through driver 183, PICK-SOL 75*s* through driver 184, GATE-SOL 97*s* through driver 185, INVT-SOL 92*s* through driver 186, RGT-SOL 74*s* through driver 187 and FEED-SOL 72*s* through driver 188.

Figure 10A:
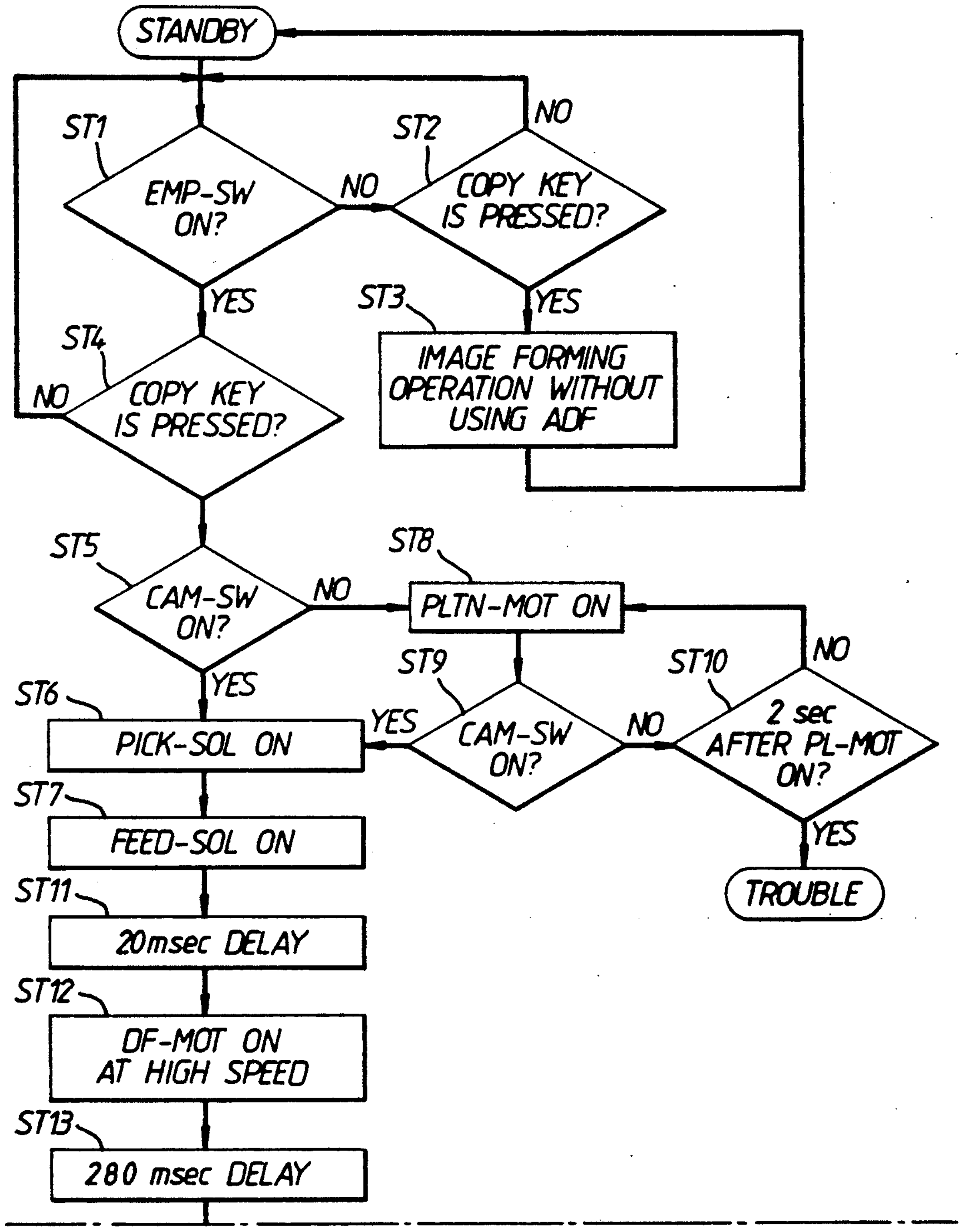
FIGS. 10*a*–*b*, 11*a*–*b*, 12*a*–*b*, 13 and are flow charts showing operation for the image formation using the automatic document feeder.
Figure 10B:
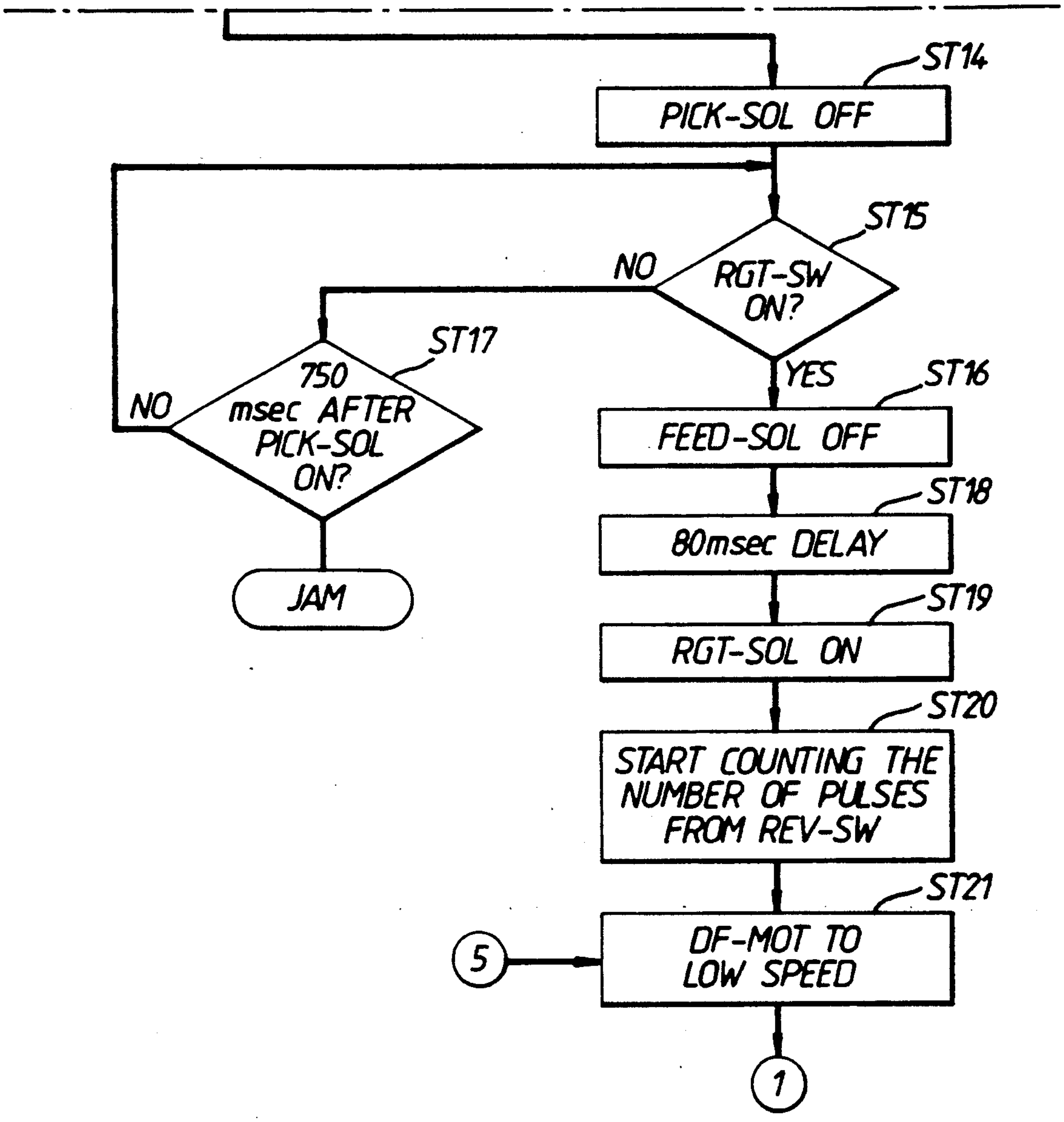
Figure 11A:
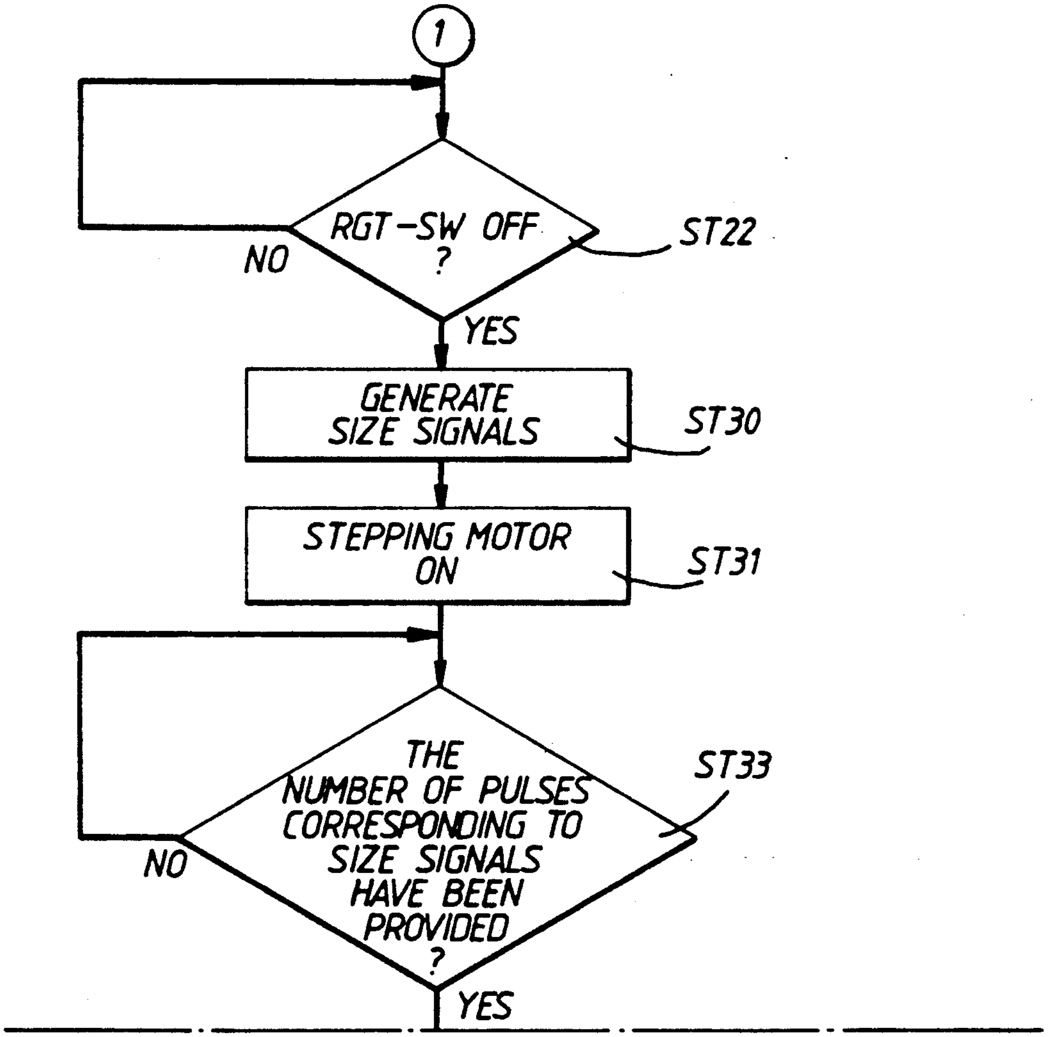
Figure 11B:
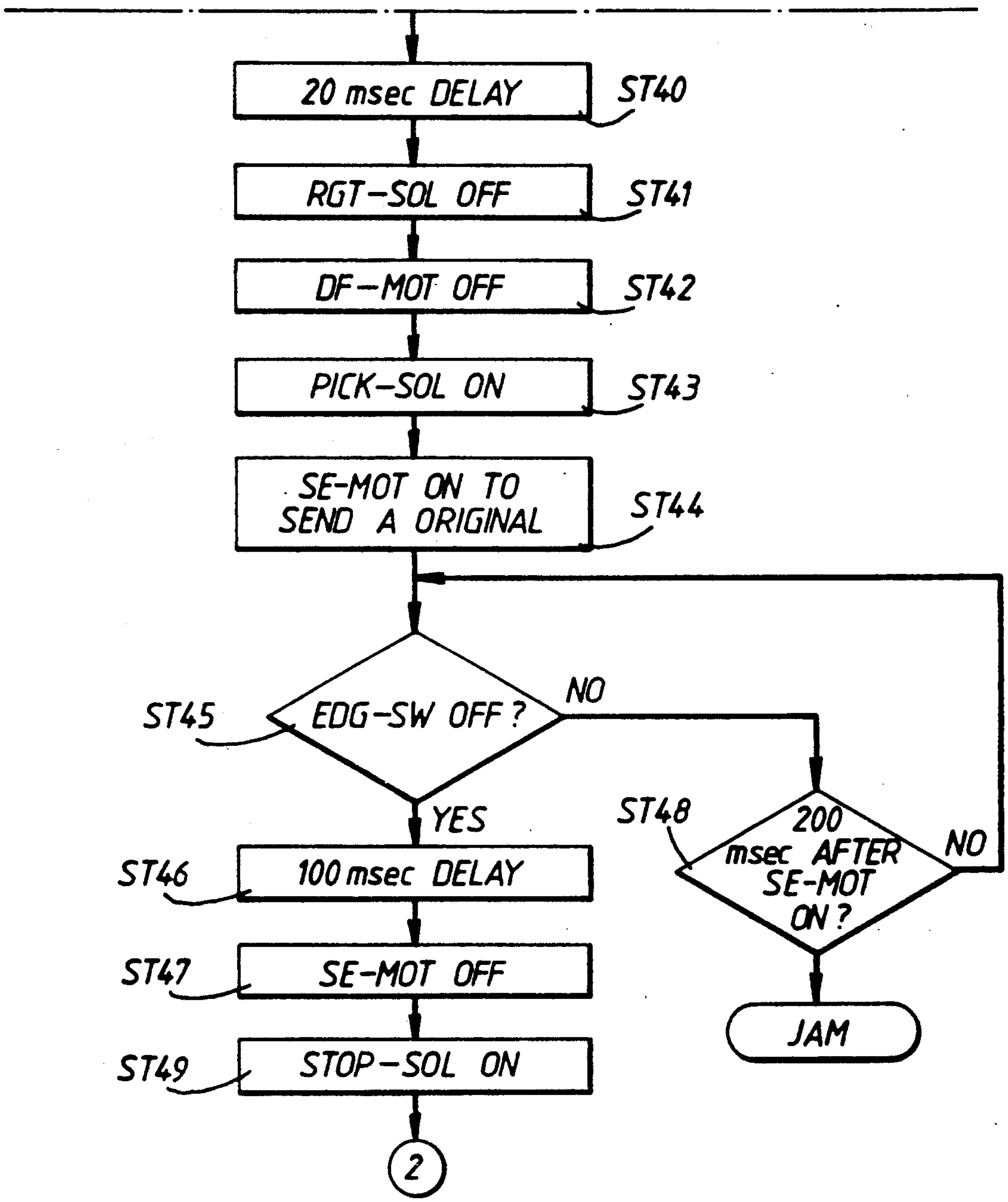
Figure 12A:
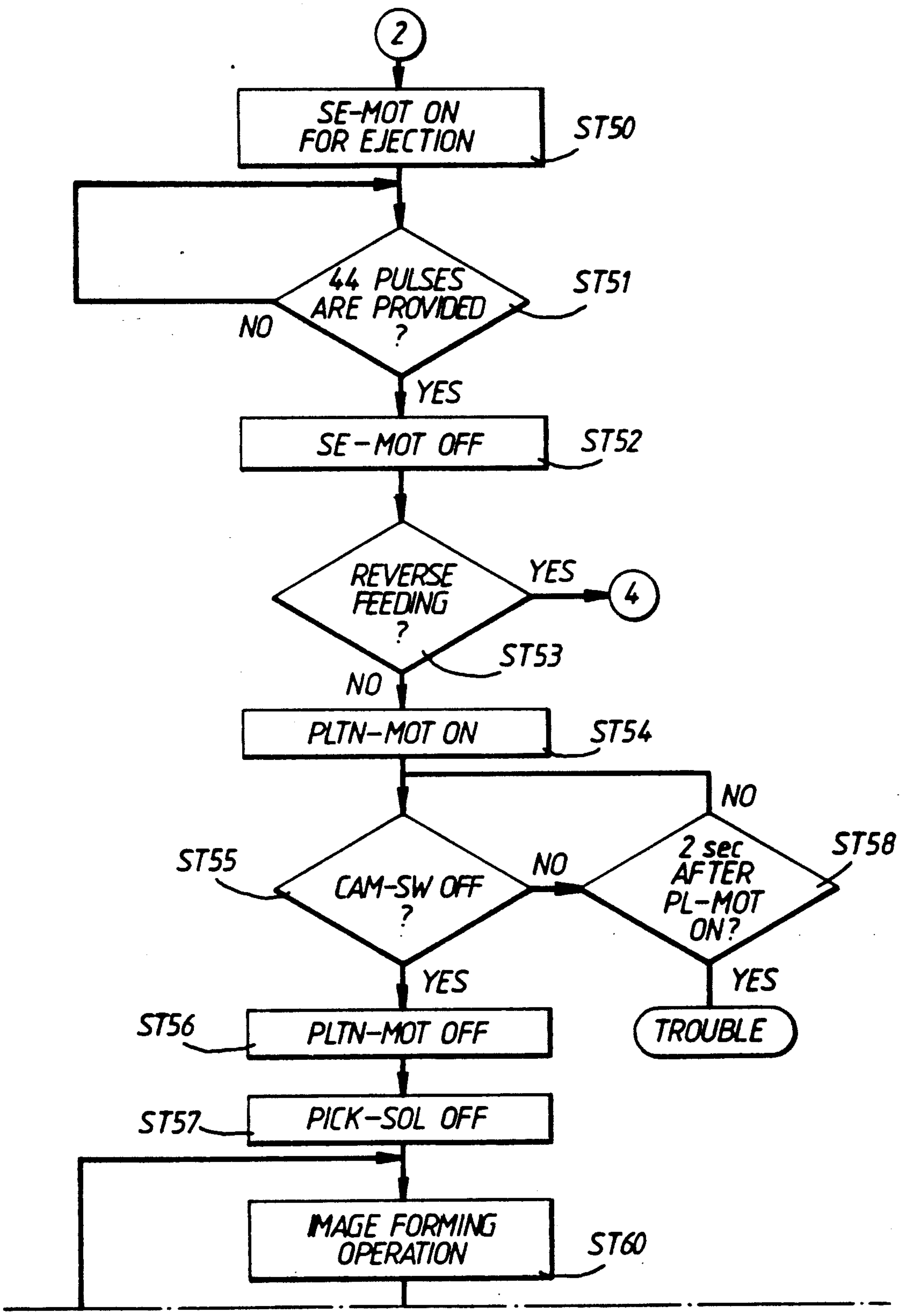
Figure 12B:
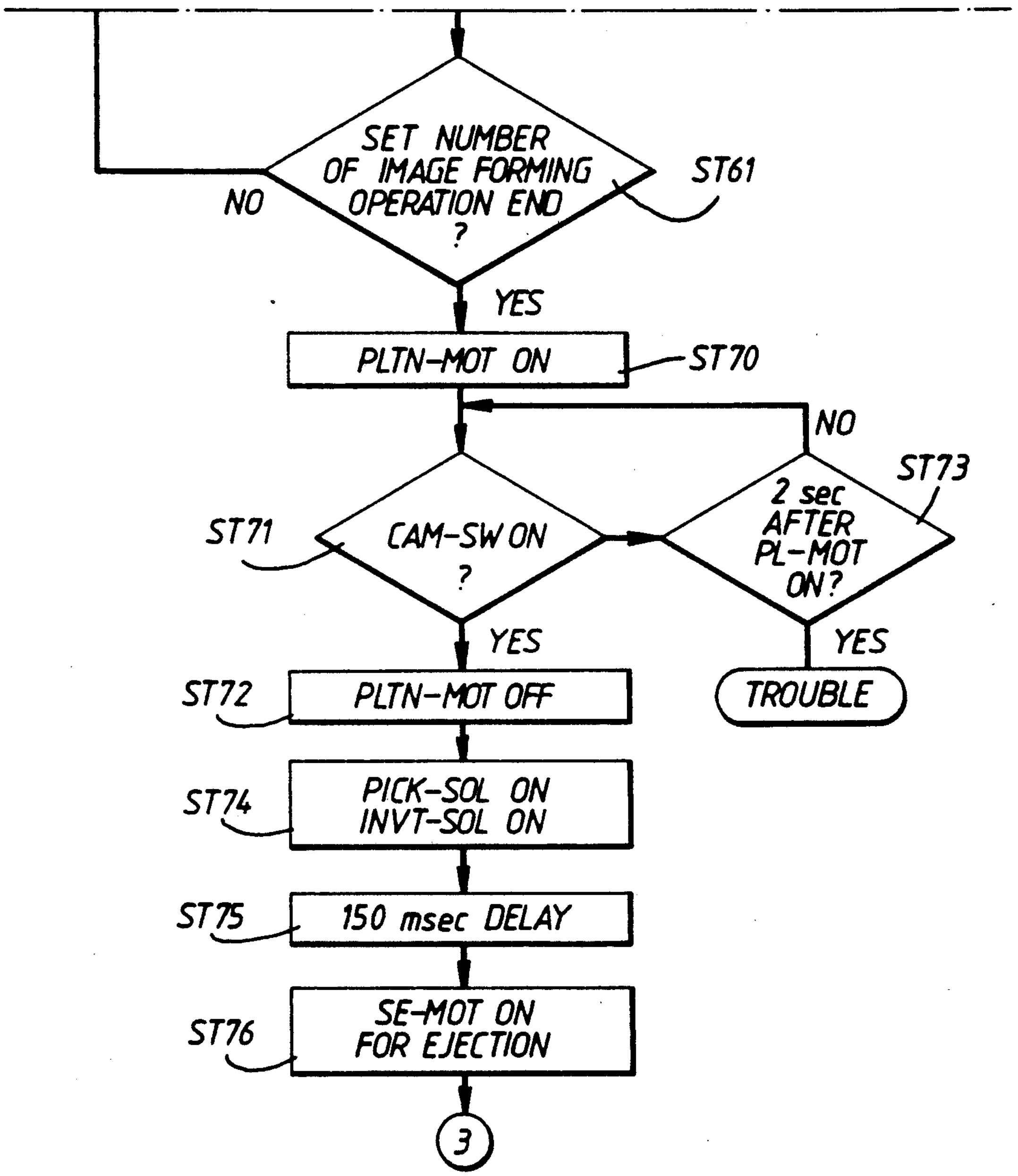
Figure 13:
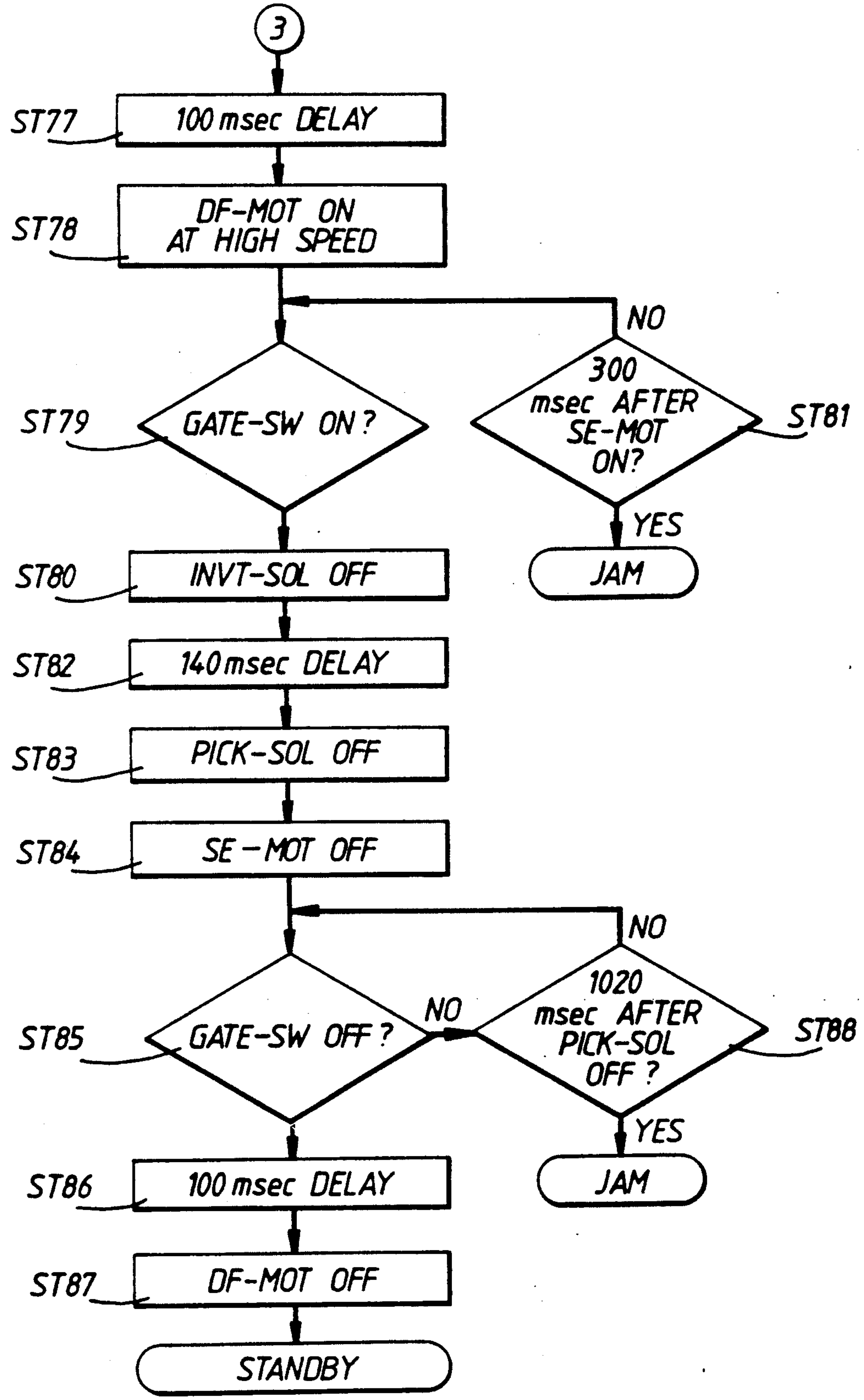
Figure 14:
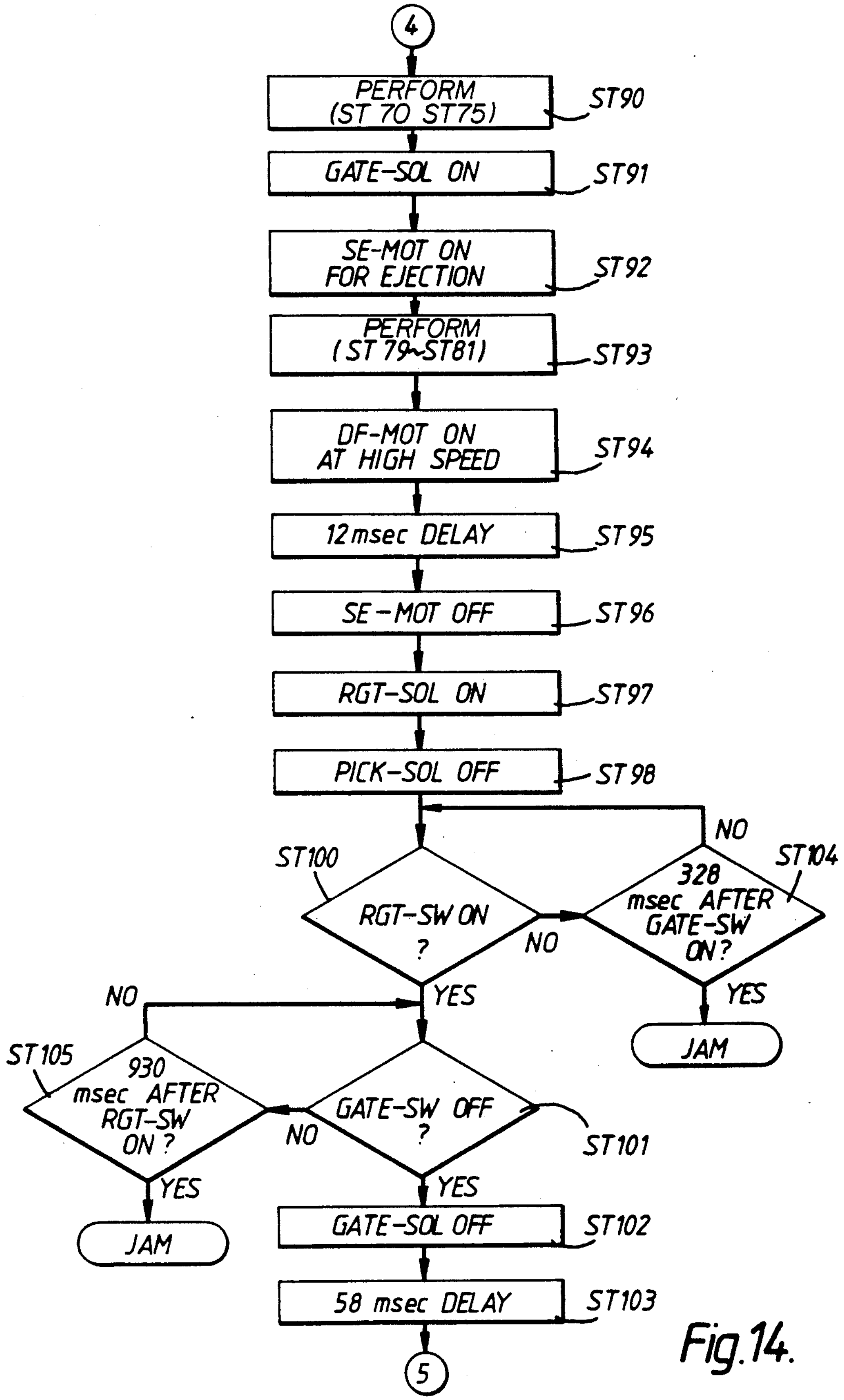

Referring to FIGS. 10*a–b* through FIG. 14, the image forming operation performed by this control device will now be described.

First, if copy key 143 is pressed when EMP-SW 80 is off, that is, when a document D is not placed on document tray 71, the control system starts the image forming operation without using ADF 3. (steps ST1, ST2 and ST3). If copy key 143 is pressed when EMP-SW 80 is turned on, the control system starts the image forming operation using ADF 3, and if CAM-SW 123*s* comes on, PICK-SOL 75*s* is turned on and FEED-SOL 72*s* is turned on (steps ST1, ST4, ST5, ST6 and ST7). In ST5, if CAM-SW 123*s* turns off, PLTN-MOT is turned on until CAM-SW 123*s* comes on (steps ST8 and ST9). However, if CAM-SW 123*s* has been OFF for two seconds after PLTN-MOT 124 was turned on, ADF processor unit 141 considers this condition to indicate trouble occurring in ADF 3 (step ST10).

After 20 milliseconds ("msec") from FEED-SOL 72*s* ON, DF-MOT 94*s* is turned on at high speed (steps ST11 and ST12). Hence, pickup roller 70 is rotated, and the uppermost document D is picked up from document tray 71.

After a delay of 280 msec from DF-MOT 94*s* ON, PICK-SOL 75*s* is turned off (steps ST13 and ST14). At this time, the uppermost document D is fed to document separating means 72. Thereafter, document D is fed until the leading edge abuts aligning rollers 74 and is correctly aligned. RGT-SW 81 comes on when the leading edge of document D arrives at actuator 81*a*, then FEED-SOL 72*s* is turned off (steps ST15 and ST16). However, if RGT-SW 81 has been OFF for 750 msec after PICK-SOL 75*s* was turned on, ADF processor unit 141 considers this condition to indicate that a JAM occurred in document path 73 (step ST17).

After an 80 msec delay from FEED-SOL 72*s* ON, RGT-SOL is turned on, then ADF processor unit 141 receives and starts counting pulses from REV-SW 83*s* (steps ST18, ST19 and ST20). Thus, ADF processor unit 141 starts the operation of detecting the document size. Simultaneously, ADF processor unit 141 reduces the speed of DF-MOT 94*s* (step ST21). As a result, the speed at which document D is being fed decreases.

Meanwhile, the right end of inverting device 92 in FIG. 3 is located at the lower position. Hence, second document stopper 85 and sending roller 75 are lifted at an upper position where second document stopper 85 and sending rollers 75 separate from platen 30. Thus, document D is further fed to the downstream position.

When document D passes by RGT-SW 81, RGT-SW 81 is turned off, then ADF processor unit 141 detects the document size in the manner previously discussed. ADF processor unit 141 provides SIZE signals which designate the document size to main processor unit 140 (steps ST22 and ST30). Stepping motor 54 is turned on. During a time, as shown in FIG. 7, main processor unit 140 provides a number of pulses, corresponding to the SIZE signals provided by ADF processor unit 141, to stepping motor 54. As a result, first carriage 50 is moved to the STARTING POSITION corresponding to the document size (steps ST31 and ST32).

After a 20 msec delay from step ST33, RGT-SOL 74*s* and DF-MOT 94*s* are turned off, and PICK-SOL 75*s* and SE-MOT 75*m* are turned on (steps ST40 and ST44). As a result, aligning rollers 74 are stopped and sending roller 75 starts to rotate. Thereafter, document D is fed by means of sending roller 75.

Next, EDG-SW 82 turns off when the trailing edge of document D arrives at actuator 82a. Then, 100 msec later, SE-MOT 75m is turned off (steps ST45, ST46 and ST47). However, if EDG-SW 82 has been in the off condition for 200 msec after SE-MOT 75m was turned on, ADF processor unit 141 considers this condition to indicate that a JAM occurred in document path 73 (step ST48). In step ST47, the trailing edge of document D passes over position 86. STOPPER-SOL 85s is turned on and second document stopper 85 is lowered to contact platen 30 (step ST49).

After step ST49, ADF processor unit 141 provides SE-MOT 75m with 44 pulses so that sending roller 75 rotates in the reverse direction by a predetermined amount (steps ST50, ST51 and ST52). In other words, the trailing edge of document D changes to the leading edge, and document D is fed until the leading edge reaches position 86, at which second document stopper 85 stops document D.

Thereafter, if image forming device 2 and ADF 3 are not set in the double side copying mode, PLTN-MOT 124 is turned on until CAM-SW 123s turns off, then PICK-SOL 75s is turned off (steps ST53 to ST57). As a result, platen sheet 62 is lowered and, after document D is pressed and held at a correct position on platen 30 by platen sheet 62, sending roller 75 is lifted. If CAM-SW 123s has been in the ON condition for two seconds after PLTN-MOT 124 was turned on, ADF processor unit 141 considers this condition to indicate trouble occurring in ADF 3 (step ST58).

After step ST58, the image forming operation previously discussed is performed for set numbers (steps ST60 and ST61). During this time, first carriage 50 is reciprocally moved between STARTING POSITION and position 86 for scanning.

Upon completion of the image forming operation of document D, PLTN-MOT 124 is turned on until CAM-SW 123s turns on (steps ST70, ST71 and ST72). Thereby, platen sheet 62 is lifted, forming a gap between platen 30 and platen sheet 62. If CAM-SW 123s has been in the ON condition for two seconds after PLTN-MOT 124 was turned on, ADF processor unit 141 considers this condition to indicate that trouble has occurred in ADF 3 (step ST73).

After step ST72, PICK-SOL 75s and INVT-SOL 92s are turned on, and after a 150 msec delay, SE-MOT 75m is turned on in the reverse direction (steps ST74, ST75 and ST76). Thereby, inverting device 92 is rotated by INVT-SOL 92s, the left end of inverting device 92 in FIG. 3 moves into the lower position. On the other hand, sending roller 75 is lowered by PICK-SOL 75s and rotated for the ejection by SE-MOT 75m. As a result, document D is fed by sending roller 75 and guided into document ejecting path 90 by means of inverting device 92.

After a 100 msec delay from SE-MOT 75m ON, DF-MOT 94s is turned on at high speed. When GATE-SW 93 turns on, in other words, GATE-SW 93 detects document D, INVT-SOL 92s is turned off (steps ST77 to ST80). While document D is fed by sending roller 75 in document ejection path 90, document ejecting rollers 94 are rotated by DF-MOT 94s. Inverting device 92 is rotated in the clockwise direction in FIG. 3 by INVT-SOL 92s OFF. However, if GATE-SW 93 has been in the off condition for 300 msec after SE-MOT 75m was turned on, ADF processor unit 141 considers this condition to indicate that a JAM occurred in document ejecting path 90 (step ST81).

After a 140 msec delay from INVT-SOL 92s OFF, PICK-SOL 75s and SE-MOT 75m are turned off (steps ST82, ST83 and ST84). As a result, sending roller 75 is lifted and the rotation is stopped.

After a 100 msec delay from GATE-SW 93 OFF, DF-MOT 94s is turned off (steps ST85, ST86 and ST87). About 100 msec after the trailing edge of document D has passed the position at which GATE-SW 93 is located, document D has been ejected. Because document D is normally ejected within 70 msec, when the rotation of document ejecting rollers 94 is stopped, document D has been ejected. However, if GATE-SW 93 has been the ON condition for 1020 msec after PICK-SOL 75s was turned off, ADF processor unit 141 considers this condition to indicate that a JAM occurred in document ejecting path 90.

When image forming device 2 is set in the double side copying mode by input device 144, ADF processor unit 141 advances from step ST53 to step ST90, where aforementioned steps ST70 to ST75 are performed, as shown in FIG. 14. After step ST90, GATE-SOL 97s is turned on and SE-MOT 75m is turned on in the reverse direction (steps ST91 and ST92). As a result, inverting device 92 is rotated in the counterclockwise direction by INVT-SOL 92s and the left end of inverting device 92 in FIG. 3 moves into the lower position. On the other hand, sending roller 75 is lowered by PICK-SOL 75s and rotated for the ejection by SE-MOT 75m. Further, sorting gate 97 is rotated in the clockwise direction by GATE-SOL 97s. As a result, document D is fed by sending roller 75 and guided into document ejecting path 90 by means of inverting device 92. Next, document D is guided to document inverting rollers 98 in document returning path 96 by sorting gate 97.

After step ST92, ADF processor unit 141 performs aforementioned steps ST79 to ST81, then DF-MOT 94s is turned on at high speed (steps ST93 and ST94). After a 12 msec delay from DF-MOT 94s ON, SE-MOT 75m is turned off, RGT-SOL 74s is turned on, and PICK-SOL 75s is turned off. When GATE-SW 93 is turned on, in other words when GATE-SW 93 detects document D, document inverting rollers 98 are rotated by DF-MOT 94s. Document D is turned upside down and fed to aligning rollers 74. In steps ST96 and ST97, sending roller 75 stops the rotation and is lifted. Aligning rollers 74 start the rotation and feed document D, fed by document inverting rollers 98, onto platen 30.

When RGT-SW 81 is turned on by document D and GATE-SW 93 is turned on, GATE-SOL 97s is turned off (steps ST100, ST101 and ST102). After a 58 msec delay from GATE-SOL 97s OFF, ADF processor unit 141 performs steps ST21 to ST57, then main processor unit 140 performs the image forming operation in step ST60. However, if RGT-SW 81 has been in the OFF condition for 328 msec after GATE-SW 93 is turned on. ADF processor unit 141 considers this condition to indicate that a JAM occurred in document returning path 96 (step ST104). If GATE-SW 93 has been in the on condition for 930 msec after RGT-SW 81 was turned on, ADF processor unit 141 considers this condition to indicate that a JAM occurred in document returning path 96 (step ST104). When image forming device 2 is set in the double side copying mode, ADF processor unit 141 performs step ST90 to step ST104 and step ST21 to step ST57 again after the image forming operation. In this way, both sides of document D are provided on platen 30.

It should be noted that this invention is not restricted to the embodiment described above and various design modifications are possible. For example, the position of the arrangement of the detecting switch for detecting the document size, or the construction of the detecting switch, etc. can be chosen at will. Document size could be detected while the document is on the platen. Document size can also be detected optically. In addition, it would be satisfactory to detect document size by detecting the time required for a document to pass a single detector. Thus, those of ordinary skill will understand that these and other variation can be practiced without departing from the spirit of the invention or the scope of the appended claims.

What is claimed is:

1. An image forming apparatus, comprising:

a platen on which a document having an image is placed:

means for positioning a first end of the document on the platen:

means for detecting a position of a second end different from the first end of the document positioned by the positioning means on the platen;

means for scanning the image of the document from a starting position of the second end detected by the detecting means; and means for forming an image on an image bearing member, the image formed corresponding to the image scanned by the scanning means.

2. The image forming apparatus recited in claim 1, wherein the scanning means includes means for driving the scanning means to scan in a range defined by the starting position and the one end of the document positioned by the positioning means.

3. An image forming apparatus, comprising:

a platen on which a document having an image is placed;

means for transferring the document placed on the platen;

means for positioning a trailing edge of the document transferred by the transferring means;

means for detecting a position of a leading edge opposite the trailing edge of the document on the platen to determine a size of the document positioned by the positioning means;

means for scanning the image of the document placed on the platen from the position of the leading edge detected by the detecting means; and means for forming an image on an image bearing member, the image corresponding to the image scanned by the scanning means.

4. The image forming apparatus recited in claim 3, wherein the transferring means includes means for sending the document in a first direction onto said platen and for discharging the document from the platen in a second direction opposite to the first direction.

5. The image forming apparatus recited in claim 4, wherein the detecting means includes means for receiving information designating the size of the document to be scanned by the scanning means.

6. The image forming apparatus recited in claim 5, wherein the detecting means includes means for generating the information while the transferring means transfers the document onto the platen.

7. The image forming apparatus recited in claim 6, wherein the generating means includes first generating means for generating a signal designating a length of the document and second generating means for generating a signal designating a width of the document.

8. The image forming apparatus recited in claim 7, wherein the detecting means includes means for moving the scanning means to the starting position before the image forming means starts forming the image.

9. The image forming apparatus recited in claim 6, wherein the means for generating the information comprises a pulse generator, the pulse generator producing a number of pulses representing document size.

* * * * *